United States Patent
Park et al.

(10) Patent No.: US 12,314,370 B2
(45) Date of Patent: May 27, 2025

(54) DIGITAL RIGHTS MANAGEMENT DATA CONVERSION IN A CONTENT DELIVERY NETWORK

(71) Applicant: Comcast Cable Communications, LLC, Philadelphia, PA (US)

(72) Inventors: Kyong Park, Haverford, PA (US); John Robinson, South Riding, VA (US); Nikola Kolev, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 544 days.

(21) Appl. No.: 16/105,279

(22) Filed: Aug. 20, 2018

(65) Prior Publication Data

US 2020/0057840 A1 Feb. 20, 2020

(51) Int. Cl.
*G06F 21/10* (2013.01)
*G06F 21/44* (2013.01)
*H04L 9/08* (2006.01)

(52) U.S. Cl.
CPC ............ *G06F 21/44* (2013.01); *H04L 9/0819* (2013.01); *G06F 21/1063* (2023.08); *G06F 2221/2129* (2013.01); *H04L 2209/603* (2013.01)

(58) Field of Classification Search
CPC .. G06F 21/10; G06F 21/44; G06F 2221/2129; G06F 2221/0728;
(Continued)

(56) References Cited

U.S. PATENT DOCUMENTS 8,037,541 B2 * 10/2011 Montague .......... H04N 21/2541
726/28
8,782,711 B2 * 7/2014 Kuether ............. H04N 7/17336
725/58
(Continued)

FOREIGN PATENT DOCUMENTS

JP 2014149864 A * 8/2014 ............. G06F 21/10
WO WO-2012151068 A2 * 11/2012 ............. G06F 21/10

OTHER PUBLICATIONS

Taban, et al., "Towards a Secure and Interoperable DRM Architecture", Retrieved at <<http://delivery.acm.org/10.1145/1180000/1179524/p69-taban.pdf?key-1=1179524&key2=9317639421&coll=GUIDE&dl=GUIDE&CFID=47490296&CFTOKEN=574326-91>>, In Proceedings of the ACM Workshop on Digital Rights Management, Oct. 30, 2006.*
(Continued)

*Primary Examiner* — Zhimei Zhu
(74) *Attorney, Agent, or Firm* — Banner & Witcoff, Ltd.

(57) ABSTRACT

Systems, apparatuses, and methods are described for converting digital rights management (DRM) data in a specific protocol to standardized DRM data. The standardized DRM data may be used to secure content delivered to user devices through a content delivery network. If a user device decides to record a content item, a request for authenticating entitlement to the content item may be sent to a network device and the network device may reply with an authentication receipt if appropriate. If the user device later decides to access the content item, the user device may send the authentication receipt back to the network server so that the network server may reply with a decryption key for decrypting the content item.

39 Claims, 8 Drawing Sheets

(58) Field of Classification Search
CPC . H04L 9/0819; H04L 9/083; H04L 2209/603; H04L 9/0894; H04L 9/3226
See application file for complete search history.

(56) References Cited

U.S. PATENT DOCUMENTS

| | | | | |
|---|---|---|---|---|
| 8,904,191 B2* | 12/2014 | Burns | G06F 21/10 | 713/193 |
| 9,047,482 B2* | 6/2015 | Riegel | H04L 65/4084 | |
| 9,148,690 B2* | 9/2015 | Nijim | H04N 21/43615 | |
| 9,313,530 B2* | 4/2016 | Helms | H04N 7/17354 | |
| 10,171,528 B2* | 1/2019 | Wissingh | H04L 65/601 | |
| 10,296,878 B1* | 5/2019 | Hu | G06Q 20/1235 | |
| 10,523,723 B2* | 12/2019 | Famaey | H04L 65/4084 | |
| 10,601,838 B2* | 3/2020 | Hussain | H04W 12/08 | |
| 10,698,987 B2* | 6/2020 | Baumgartner | H04L 63/10 | |
| 2002/0184515 A1* | 12/2002 | Oho | G06F 21/105 | 713/193 |
| 2003/0236978 A1* | 12/2003 | Evans | H04N 21/4408 | 713/164 |
| 2004/0158712 A1* | 8/2004 | Lee | H04L 63/0464 | 713/165 |
| 2005/0027871 A1* | 2/2005 | Bradley | G06Q 20/1235 | 709/227 |
| 2006/0282391 A1* | 12/2006 | Peterka | G06F 21/10 | 705/57 |
| 2007/0156601 A1* | 7/2007 | Brew | G06F 21/10 | 705/57 |
| 2008/0022061 A1* | 1/2008 | Ito | H04N 21/4147 | 711/162 |
| 2008/0025507 A1* | 1/2008 | Taylor | H04N 21/4405 | 380/201 |
| 2008/0086757 A1* | 4/2008 | Pestoni | H04N 21/83555 | 726/2 |
| 2008/0126801 A1* | 5/2008 | Lee | H04L 9/3247 | 713/167 |
| 2008/0208755 A1* | 8/2008 | Malcolm | G06F 21/10 | 705/59 |
| 2008/0249946 A1* | 10/2008 | Candelore | G06F 21/10 | 705/59 |
| 2008/0304661 A1* | 12/2008 | Kato | H04L 9/085 | 380/44 |
| 2008/0310628 A1* | 12/2008 | Fujioka | H04L 9/3236 | 380/201 |
| 2009/0007240 A1* | 1/2009 | Vantalon | H04N 21/8355 | 726/4 |
| 2009/0084862 A1* | 4/2009 | McCallum | E01B 7/00 | 238/12 |
| 2009/0165080 A1* | 6/2009 | Fahn | G06F 21/10 | 726/1 |
| 2010/0043077 A1* | 2/2010 | Robert | H04L 63/08 | 726/27 |
| 2010/0114739 A1* | 5/2010 | Johnston | G06Q 30/0601 | 705/26.1 |
| 2010/0138671 A1* | 6/2010 | Kim | G06F 21/10 | 713/189 |
| 2010/0138903 A1* | 6/2010 | Medvinsky | H04L 9/083 | 726/6 |
| 2010/0257370 A1* | 10/2010 | Yoon | G06F 21/10 | 713/189 |
| 2011/0010298 A1* | 1/2011 | Robert | G06Q 10/06 | 705/59 |
| 2011/0010545 A1* | 1/2011 | Kill | H04N 21/4408 | 713/168 |
| 2011/0010562 A1* | 1/2011 | Kill | H04N 21/4181 | 713/189 |
| 2011/0010777 A1* | 1/2011 | Robert | H04L 9/0822 | 726/29 |
| 2011/0023083 A1* | 1/2011 | Eom | H04L 63/10 | 726/1 |
| 2011/0029768 A1* | 2/2011 | Nam | G06F 21/10 | 713/150 |
| 2011/0082946 A1* | 4/2011 | Gopalakrishnan | H04L 67/2828 | 709/231 |
| 2011/0150214 A1* | 6/2011 | Gleim | H04N 21/4788 | 380/200 |
| 2011/0231661 A1* | 9/2011 | Ramakrishnan | H04L 67/1078 | 713/171 |
| 2011/0249543 A1* | 10/2011 | Kobayashi | G06F 21/10 | 369/84 |
| 2011/0249957 A1* | 10/2011 | Kobayashi | H04N 13/172 | 386/252 |
| 2011/0252058 A1* | 10/2011 | Kobayashi | G11B 20/00855 | 707/770 |
| 2011/0252323 A1* | 10/2011 | Kobayashi | G11B 20/00528 | 715/716 |
| 2011/0252484 A1* | 10/2011 | Kobayashi | G11B 20/00855 | 726/32 |
| 2012/0008479 A1* | 1/2012 | Hattori | G11B 7/00458 | 369/84 |
| 2012/0008480 A1* | 1/2012 | Hattori | G11B 20/00086 | 369/85 |
| 2012/0008921 A1* | 1/2012 | Hattori | G11B 27/329 | 386/248 |
| 2012/0023251 A1* | 1/2012 | Pyle | H04L 65/608 | 709/231 |
| 2012/0033944 A1* | 2/2012 | Hattori | H04N 21/85406 | 386/248 |
| 2012/0090034 A1* | 4/2012 | Kang | G06F 21/10 | 726/26 |
| 2012/0090036 A1* | 4/2012 | Kang | H04N 21/2347 | 726/27 |
| 2012/0265694 A1* | 10/2012 | Tuchman | G06Q 10/02 | 705/304 |
| 2012/0265695 A1* | 10/2012 | Tuchman | G06Q 10/02 | 705/304 |
| 2012/0265696 A1* | 10/2012 | Tuchman | G06Q 30/016 | 705/304 |
| 2012/0265697 A1* | 10/2012 | Tuchman | G06Q 30/016 | 705/304 |
| 2012/0265800 A1* | 10/2012 | Tuchman | H04M 3/51 | 709/203 |
| 2012/0266258 A1* | 10/2012 | Tuchman | H04L 67/16 | 726/28 |
| 2012/0275597 A1* | 11/2012 | Knox | H04N 21/8586 | 380/210 |
| 2012/0284370 A1* | 11/2012 | Hierro | H04N 21/8456 | 709/219 |
| 2012/0284802 A1* | 11/2012 | Hierro | G06F 21/10 | 726/27 |
| 2012/0284804 A1* | 11/2012 | Lindquist | H04L 63/0428 | 726/29 |
| 2012/0317661 A1* | 12/2012 | Yamaguchi | G06F 21/10 | 726/32 |
| 2013/0054972 A1* | 2/2013 | Thorwirth | H04N 21/8358 | 713/176 |
| 2013/0145016 A1* | 6/2013 | Vantalon | H04N 21/6582 | 709/224 |
| 2013/0145406 A1* | 6/2013 | Baskaran | H04N 21/47202 | 725/87 |
| 2013/0159193 A1* | 6/2013 | Tang | G06Q 20/1235 | 705/51 |
| 2013/0163758 A1* | 6/2013 | Swaminathan | H04L 9/08 | 380/259 |
| 2013/0166906 A1* | 6/2013 | Swaminathan | H04N 21/8456 | 713/155 |
| 2013/0167253 A1* | 6/2013 | Seleznev | G06F 21/10 | 726/29 |
| 2013/0283033 A1* | 10/2013 | Ahuja | H04L 63/0807 | 713/150 |
| 2013/0283393 A1* | 10/2013 | Hierro | G06F 21/10 | 726/27 |
| 2013/0311780 A1* | 11/2013 | Besehanic | H04L 9/3247 | 713/176 |
| 2013/0347025 A1* | 12/2013 | Prakash | H04N 21/4227 | 725/25 |

(56) References Cited

U.S. PATENT DOCUMENTS

| | | | | |
|---|---|---|---|---|
| 2014/0075582 | A1* | 3/2014 | Hierro | G06F 21/128 |
| | | | | 726/30 |
| 2014/0201335 | A1* | 7/2014 | Wang | H04L 65/80 |
| | | | | 709/219 |
| 2014/0258292 | A1* | 9/2014 | Thramann | G06F 16/48 |
| | | | | 707/736 |
| 2014/0281009 | A1* | 9/2014 | Moorthy | H04N 21/85406 |
| | | | | 709/231 |
| 2014/0337411 | A1* | 11/2014 | Panje | H04N 21/8456 |
| | | | | 709/203 |
| 2014/0365759 | A1* | 12/2014 | Wang | H04L 67/02 |
| | | | | 713/151 |
| 2015/0149585 | A1* | 5/2015 | Zhang | H04L 51/14 |
| | | | | 709/217 |
| 2015/0172283 | A1* | 6/2015 | Omnes | H04W 12/08 |
| | | | | 726/9 |
| 2015/0222633 | A1* | 8/2015 | Smith | H04L 67/42 |
| | | | | 726/29 |
| 2015/0271541 | A1* | 9/2015 | Gonder | H04L 65/608 |
| | | | | 725/134 |
| 2015/0326563 | A1* | 11/2015 | Chan | H04N 21/4367 |
| | | | | 713/172 |
| 2016/0021098 | A1* | 1/2016 | Dhanabalan | H04W 12/08 |
| | | | | 726/8 |
| 2016/0080352 | A1* | 3/2016 | Okamoto | H04L 63/061 |
| | | | | 713/168 |
| 2016/0164943 | A1* | 6/2016 | Walker | H04N 21/26216 |
| | | | | 709/219 |
| 2016/0182466 | A1* | 6/2016 | Wagenaar | H04L 63/0876 |
| | | | | 713/154 |
| 2016/0316247 | A1* | 10/2016 | Biagini | H04N 21/6543 |
| 2016/0328174 | A1* | 11/2016 | Uchimura | H04N 9/8233 |
| 2017/0024548 | A1* | 1/2017 | Dorwin | G06F 16/9535 |
| 2017/0147830 | A1* | 5/2017 | Park | G06F 21/10 |
| 2017/0195448 | A1* | 7/2017 | Su | H04N 21/433 |
| 2017/0264923 | A1* | 9/2017 | Lacivita | G11B 27/102 |
| 2017/0344728 | A1* | 11/2017 | Steele | H04L 9/3231 |
| 2017/0346865 | A1* | 11/2017 | Hartman | H04N 21/2541 |
| 2018/0083920 | A1* | 3/2018 | Valsecchi | G06F 21/105 |
| 2018/0091857 | A1* | 3/2018 | Valsecchi | H04N 21/2541 |
| 2018/0152767 | A1* | 5/2018 | Liu | H04N 21/4325 |
| 2018/0174611 | A1* | 6/2018 | Kobayashi | H04N 5/85 |
| 2018/0278990 | A1* | 9/2018 | Rutland | H04N 21/4405 |
| 2019/0089528 | A1* | 3/2019 | Shimonek | H04L 9/0816 |
| 2019/0356966 | A1* | 11/2019 | Zuydervelt | H04N 21/4825 |
| 2020/0007921 | A1* | 1/2020 | Ojala | H04N 13/161 |
| 2020/0034515 | A1* | 1/2020 | Kolev | H04L 9/0618 |

OTHER PUBLICATIONS

Heileman, G.L. et al., " DRM Interoperability Analysis from the Perspective of a Layered Framework," DRM '05, Nov. 7, 2005, Alexandria, VA, USA, ACM, pp. 17-26.*

R. H. Koenen, J. Lacy, M. Mackay and S. Mitchell, "The long march to interoperable digital rights management," in Proceedings of the IEEE, vol. 92, No. 6, pp. 883-897, Jun. 2004.*

Delgado et al., "Profiles for interoperability between MPEG-21 Rel and OMA DRM," Seventh IEEE International Conference on E-Commerce Technology, 2005, CEC 2005, Jul. 19, 2005,.*

David W. Kravitz and Thomas S. Messerges. 2005. "Achieving media portability through local content translation and end-to-end rights management". In Proceedings of the 5th ACM workshop on Digital rights management (DRM '05). Association for Computing Machinery, New York, NY, USA, 27-36 (Year: 2005).*

* cited by examiner

DIGITAL RIGHTS MANAGEMENT DATA CONVERSION IN A CONTENT DELIVERY NETWORK

BACKGROUND

Digital rights management (DRM) data may indicate who has access to specific content in a content delivery network. This data may also indicate other entitlement details, including how long access should be granted, which end user devices should have access, and whether the content may be copied. DRM data may be generated using one or more specific DRM protocols. User devices that receive content secured by DRM data may be hard-wired to process DRM data in one of these DRM protocols. If a content source changes the DRM protocol it uses, that may create problems downstream for user devices that may have relied on an older protocol.

SUMMARY

The following summary presents a simplified summary of certain features. The summary is not an extensive overview and is not intended to identify key or critical elements.

Systems, apparatuses, and methods are described for converting first digital rights management (DRM) data in a first DRM protocol into second DRM data in a second DRM protocol. The converted data may comprise data independent of any specific DRM protocol. The converted data may be used to encrypt one or more content items for delivery to a user device in a content delivery network. The encrypted content item may be delivered to the user device via the content delivery network if the user device is ready to record the content. The user device may also query a content server to determine its entitlement to record the content, and if the content server determines that the user device is entitled to the content, the content server may transmit a receipt that authenticates entitlement of the user device to the content. The user device may locally store the receipt so that if the user device is ready to play the content back, the user device may transmit the receipt to the content server and may receive a decryption key for decrypting the content if the content server does not find any problems with the receipt.

In this way, user devices configured for operation with a specific DRM protocol may function to process content even if content secured by other DRM protocols is delivered to those devices.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
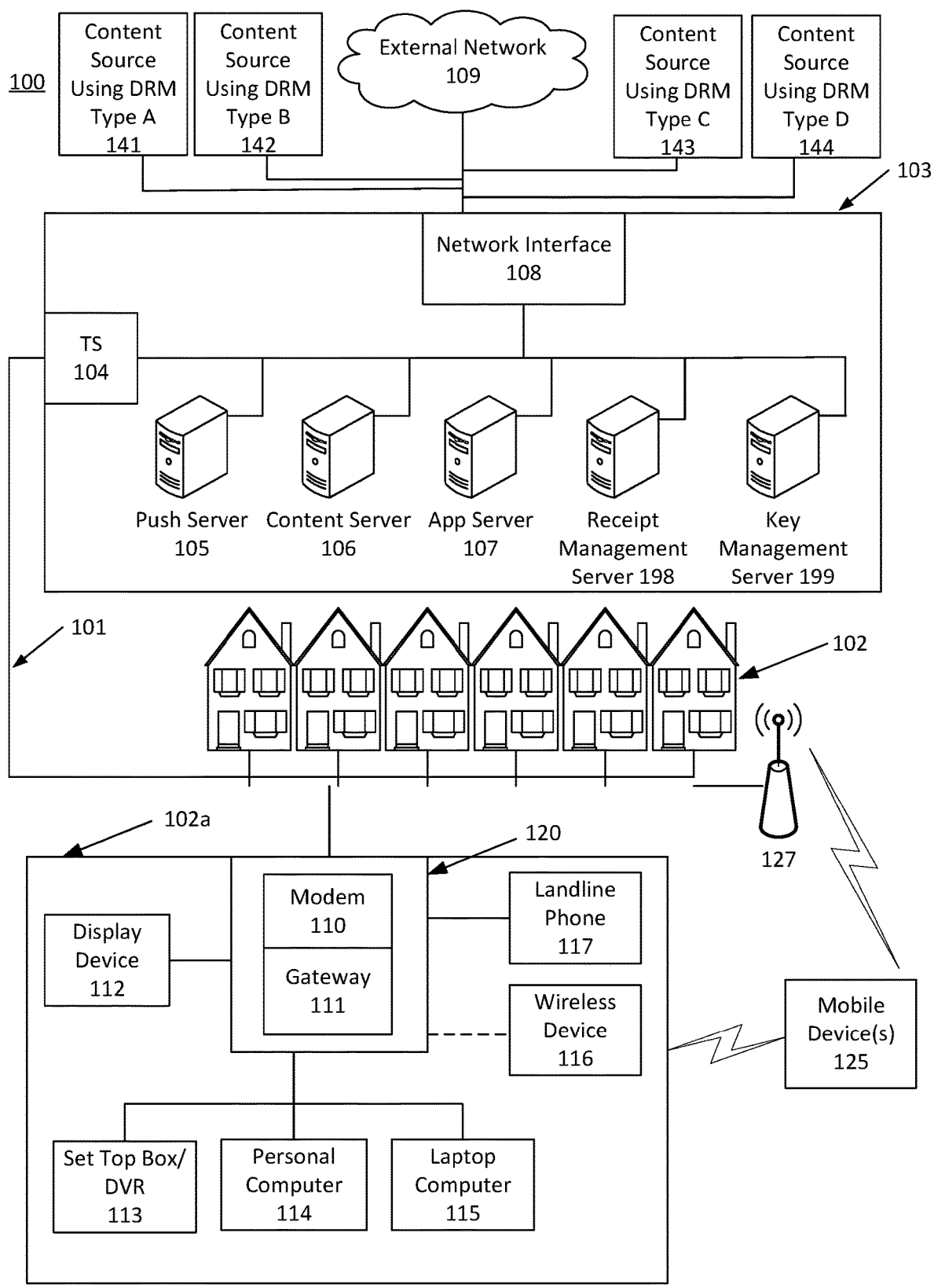
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

The communication links 101 may originate from the local office 103 and may be split to exchange information signals with the various premises 102. The communication links 101 may include other components, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107 and 198-199. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The local office 103 may also communicate with one or more content sources via a network interface 108. Each content source may secure content using a specific digital rights management (DRM) protocol and deliver that content to the local office 103. For example, a content source 141 may secure content using DRM protocol type A, a content source 142 may secure content using DRM protocol type B, a content source 143 may secure content using DRM protocol type C, and a content source 144 may secure content using DRM protocol type D. DRM data securing any given content item may indicate information related to entitlement to the content item, including information related to the identity of those who should have access to the content item, how long access to the content item should be given, which user devices should be given access to the content item, how many copies of the content item may be made by any given user, and the like. Content delivered to the local office 103 from the content sources 141-144 may be available for delivery to various premises 102 through communication links 101.

Additionally, the push notification server 105 in local office 103 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content, to initiate delivery (e.g., streaming) of the content to the requesting user(s) and/or device(s), and to generate decryption keys for decryption of encrypted content.

In addition, the content server 106 may receive content secured by various DRM protocols, such as content from the content sources 141-144. For example, a content server 106 may receive content secured by Adobe® DRM Service, PlayReady® DRM Service, or Widevine® DRM Service, among other types of DRM services. The server 106 may convert DRM data in a first DRM protocol into DRM data in a second DRM protocol. The converted data may correspond to encryption data independent of any specific DRM protocol. If a user device 112-117, 125 at a premises 102 requests authentication of entitlement to a given content item, the server 106 may determine whether the user device 112-117, 125 is entitled to access the requested content item and if the user device 112-117, 125 is entitled to access the requested content item, the server 106 may generate a receipt that authenticates access to the content item. Further still, the server 106 may generate and transmit decryption keys to a user device 112-117, 125 if the user device 112-117 at the premises 102 transmits the appropriate receipt authenticating entitlement to a given content item.

Some of the functionality associated with content server 106 may be distributed between one or more other devices. For example, a receipt management server 198 in communication with the content server 106 may manage generation and transmission of receipts for authentication of entitlement to content items. In addition, a key management server 199 in communication with the content server 106 may manage generation and transmission of decryption keys for decrypting content items that have been properly accessed.

The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The local office 103 may include additional servers, including additional push, content, and/or application servers, and/or other types of servers. Although shown separately, the push server 105, the content server 106, the application server 107, the receipt management server 198, the key management server 199, and/or other server(s) may be combined. The servers 105, 106, 107, 198, 199 and/or other servers may be computing devices and may include memory storing data and also storing computer executable instructions that, if executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/user devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103 including, for example, with the content server 106. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

Figure 2:
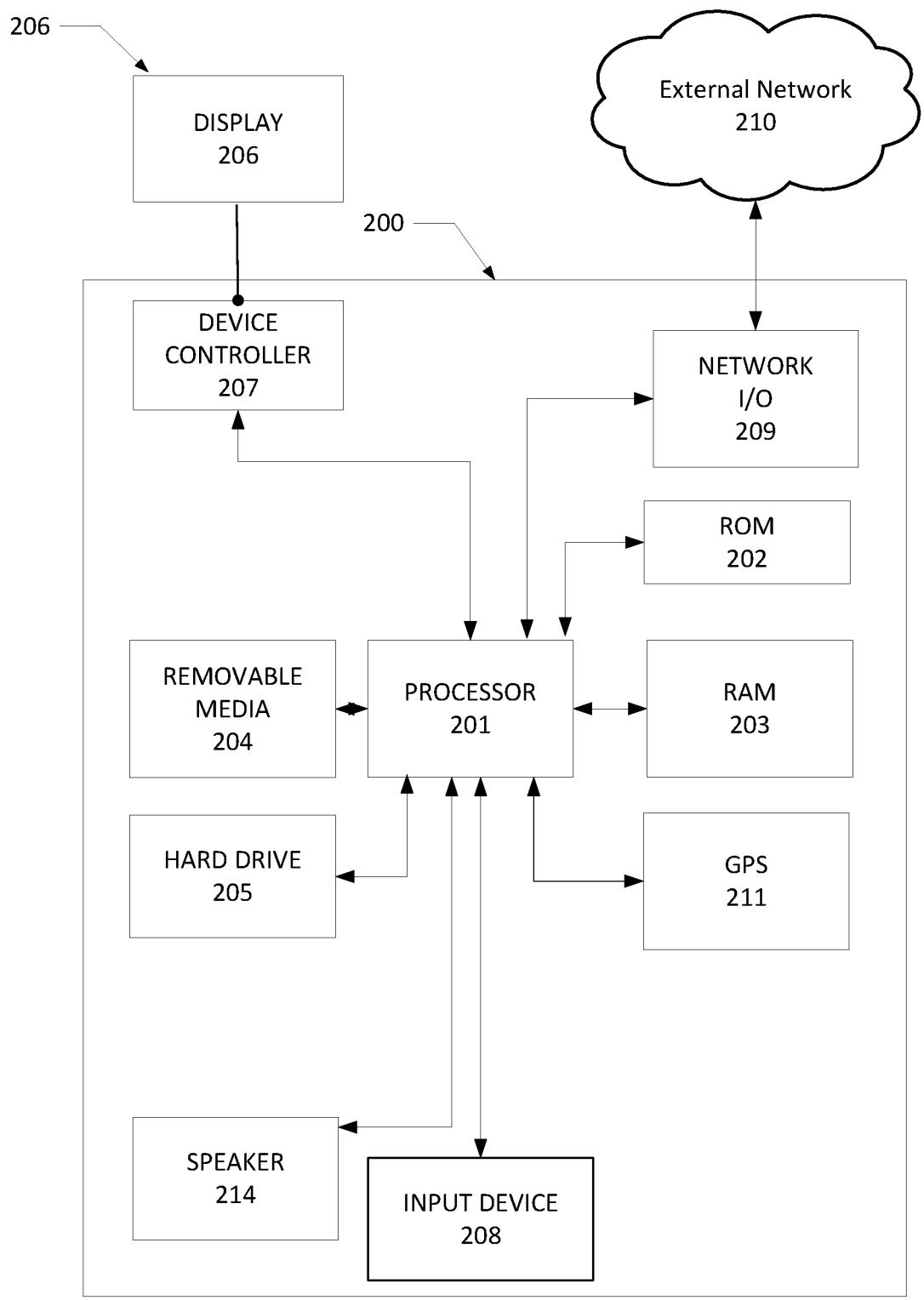
FIG. 2 shows hardware elements of a computing device.

FIG. 2 shows hardware elements of a computing device that may be used to implement any of the computing devices discussed herein (e.g., devices for conversion of DRM data from one protocol to another, for generation of receipts, etc.). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device. Finally, the device 200 may also include one or more speakers 214 to output audio signals from device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, if executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
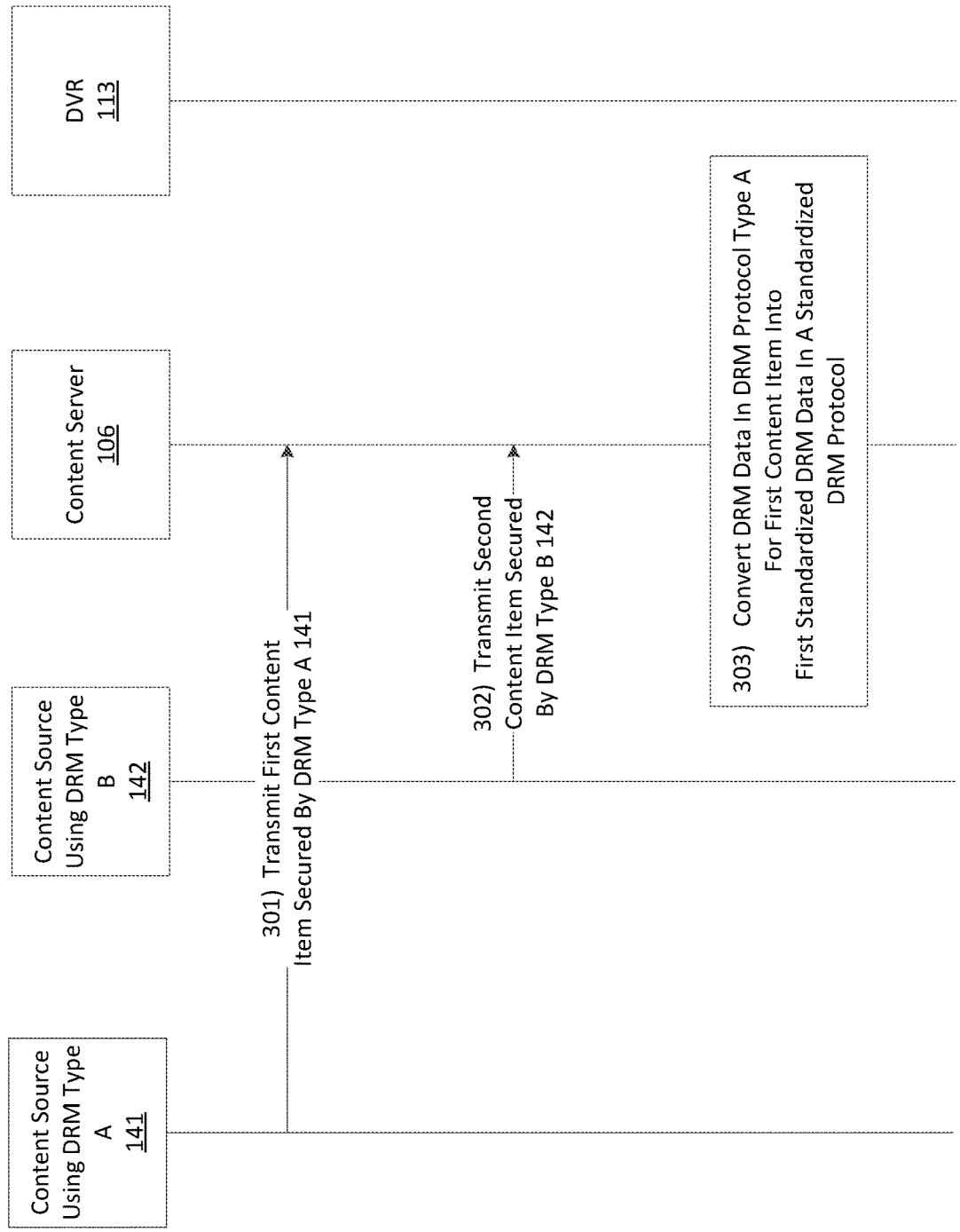
FIGS. 3a-3f are examples of a signaling diagram showing an example method for securing content with converted DRM data in a content delivery network that supports a content server and a user device.

FIGS. 3*a*-3*f* show a signaling diagram showing an example method for securing content with converted DRM data in a content delivery network that supports a content server and a user device. As shown in FIG. 3*a*, the process may start out at step 301 in which a content source 141 securing content using DRM protocol type A may transmit a first content item to the content server 106. In step 302, a content source 142 securing content using DRM protocol type B may transmit a second content item to the content server 106.

A content item may be any type of content, including audio, video, image, text, or other type of content. Moreover, the DRM data associated with a given content item may be associated with a specific DRM protocol and may indicate how access to the content item should be granted. For example, the DRM data may indicate the identity of an end user that should be granted access to the content item, how long that user should be granted access to the content item, what user devices 112-117, 125 should have access to the content item, whether the user may make copies of the content item, and how many copies the user may make, among other things. The DRM data may also indicate an encryption algorithm for encrypting the content item for delivery to the user. End user devices 112-117, 125 may be hard-wired (e.g., configured through firmware or hard-coded) to process DRM data associated with one type of DRM protocol.

In step 303, the content server 106 may convert DRM data associated with the first content item into standardized DRM data in a standardized DRM protocol. After conversion, the DRM data may be processed by the end user devices 112-117, 125 without regard to the DRM protocol from which the DRM data was generated. The content server 106 may convert DRM data associated with a specific DRM protocol into data independent of a DRM protocol. This DRM data may serve to secure the first content item through an encryption algorithm that requires a decryption key for access to the first content item.

Figure 3B:
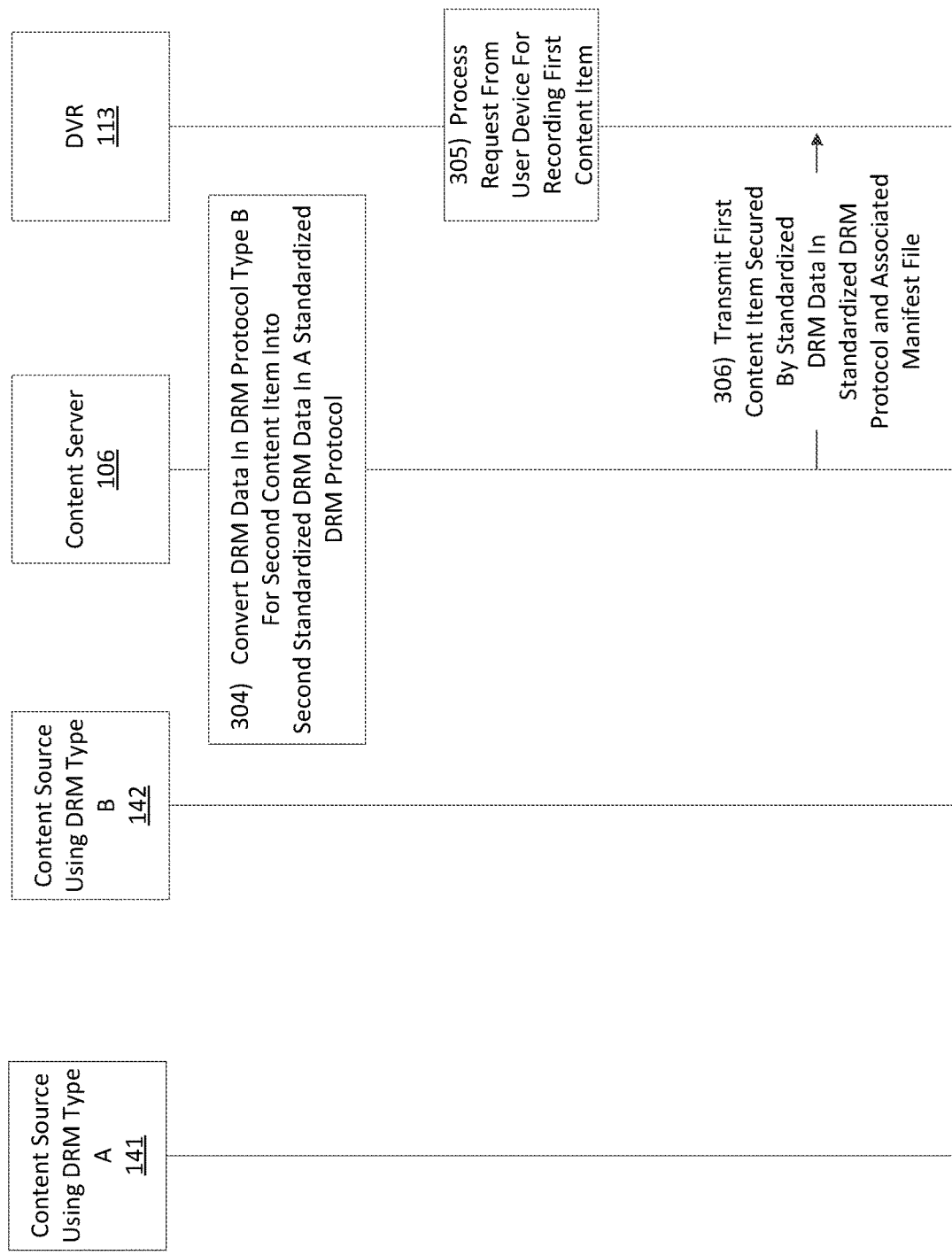

As shown in FIG. 3*b*, in step 304, the content server 106 may convert DRM data associated with the second content item into standardized DRM data in a standardized DRM protocol. After conversion, the DRM data may be processed by the end user devices 112-117, 125 without relying on the specific DRM protocol from which the DRM data was generated. The content server 106 may again convert DRM data associated with a specific DRM protocol into data independent of a DRM protocol. This data may secure the second content item through an encryption algorithm that requires a decryption key for access to the second content item.

In step 305, a user device 112-117, 125 may receive a request to record the first content item (e.g., by receiving a channel selection on a display device 112 that is currently transmitting the first content item as a liner content stream). The user device 112-117, 125 may process the request and in step 306, the content server 106 may transmit the first content item secured by the standardized DRM data in a standardized DRM protocol to a user device 112-117, 125. The first content item may be transmitted from a content server 106 after the content server 106 (or an associated content packager) has injected standardized DRM encryption metadata into the first content item at the time of content packaging. The content server 106 may also transmit an associated manifest file that includes the standardized DRM data. The manifest file may further include information on the timing of how various content fragments associated with the first content item should be rendered while the first content item is being displayed by the user device 112-117, 125.

Figure 3C:
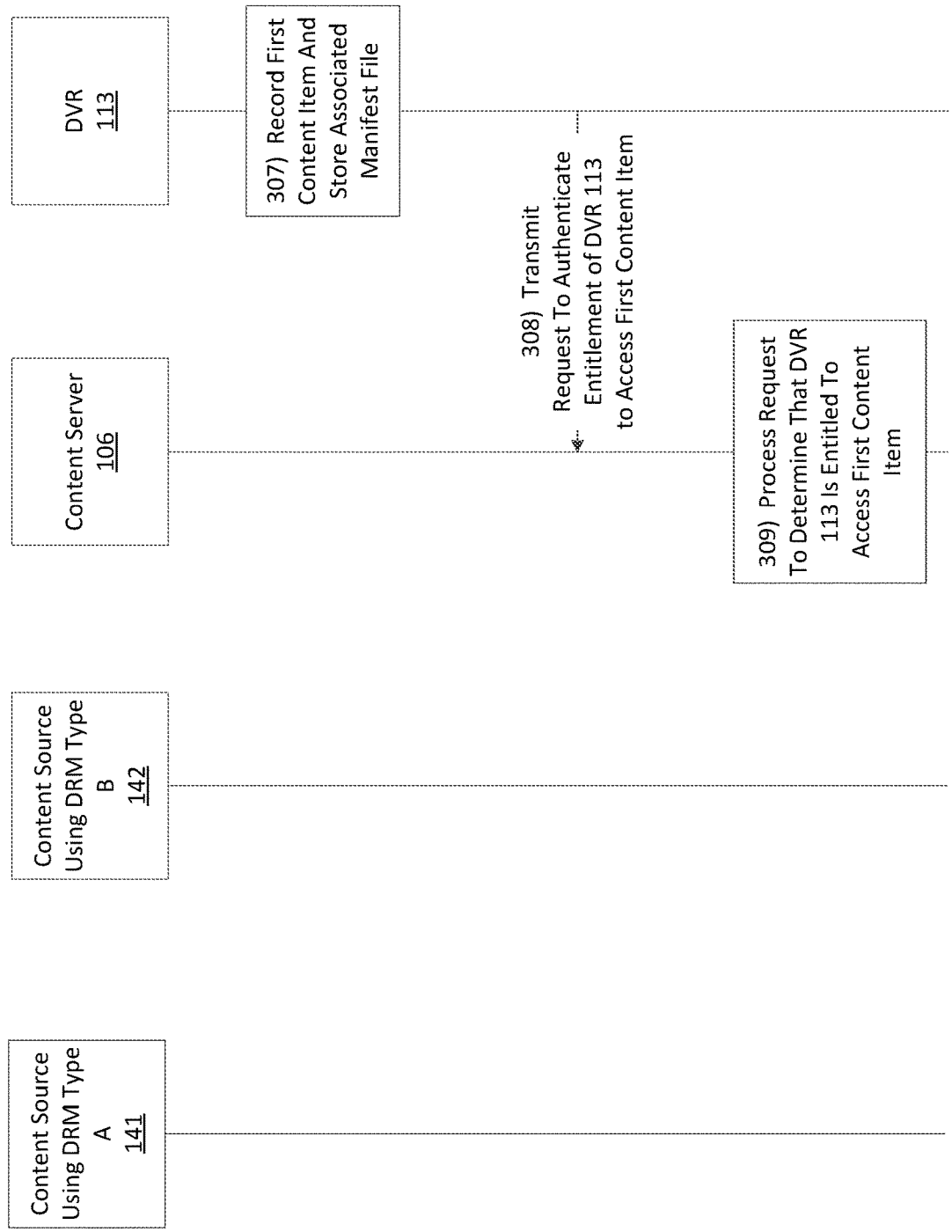

As shown in FIG. 3c, the user device 112-117, 125 may store or record the received first content item in local storage. The user device 112-117, 125 may further store the associated manifest file for the first content item. In step 308, the user device 112-117, 125 may transmit, to the content server 106 (or an associated receipt management server 198), a request to authenticate entitlement of the user device 112-117, 125 to access the first content item. The request may include a content identifier for the first content item; an account identifier for a user of the device 112-117, 125; a content class identifier for the first content item; a device identifier for the device 112-117, 125; and a device type identifier for the device 112-117, 125. The request may also include encryption metadata for encrypting the first content item.

After the request to authenticate entitlement of the user device 112-117, 125 is received, server 106 may process the request by determining whether the information included in the request is consistent with information stored in databases maintained by the local office 103 for the user devices 112-117, 125 that should be given access to the first content item. For example, the server 106 may determine that the account identifier, content class identifier, device identifier, and device type identifier included in the request are stored in a data store accessible to the local office 103 and those identifiers are listed in the data store as identifiers associated with a user that should be given access to the first content item on the user device 112-117, 125 requesting the first content item. In this situation, the process may move to step 309 in which the content server 106 may determine that the user device 112-117, 125 is entitled to access the first content item. If the content server 106 determines that the identifiers listed in the request are not associated with a user that should be given access to the first content item on the user device 112-117, 125, the server 106 may deny the user device 112-117, 125 access to the first content item. The server 106 may transmit a message detailing why the user device 112-117, 125 was denied access to the first content item.

The content server 106 may generate and display different messages (e.g., to a user interfacing with the server 106) based on the results of processing the request transmitted in step 308. For example, the server 106 may generate a message that the request was processed successfully and resulted in issuing a receipt. Alternatively, the server 106 may generate one or more error messages if a receipt cannot be transmitted to the user device 112-117, 125. For example, the server 106 may generate a message that the device identifier or account identifier contained in the request cannot be authenticated. Alternatively, the server 106 may generate a message that the server 106 has been misconfigured, is unavailable, or is overloaded and so cannot process the request.

Figure 3D:
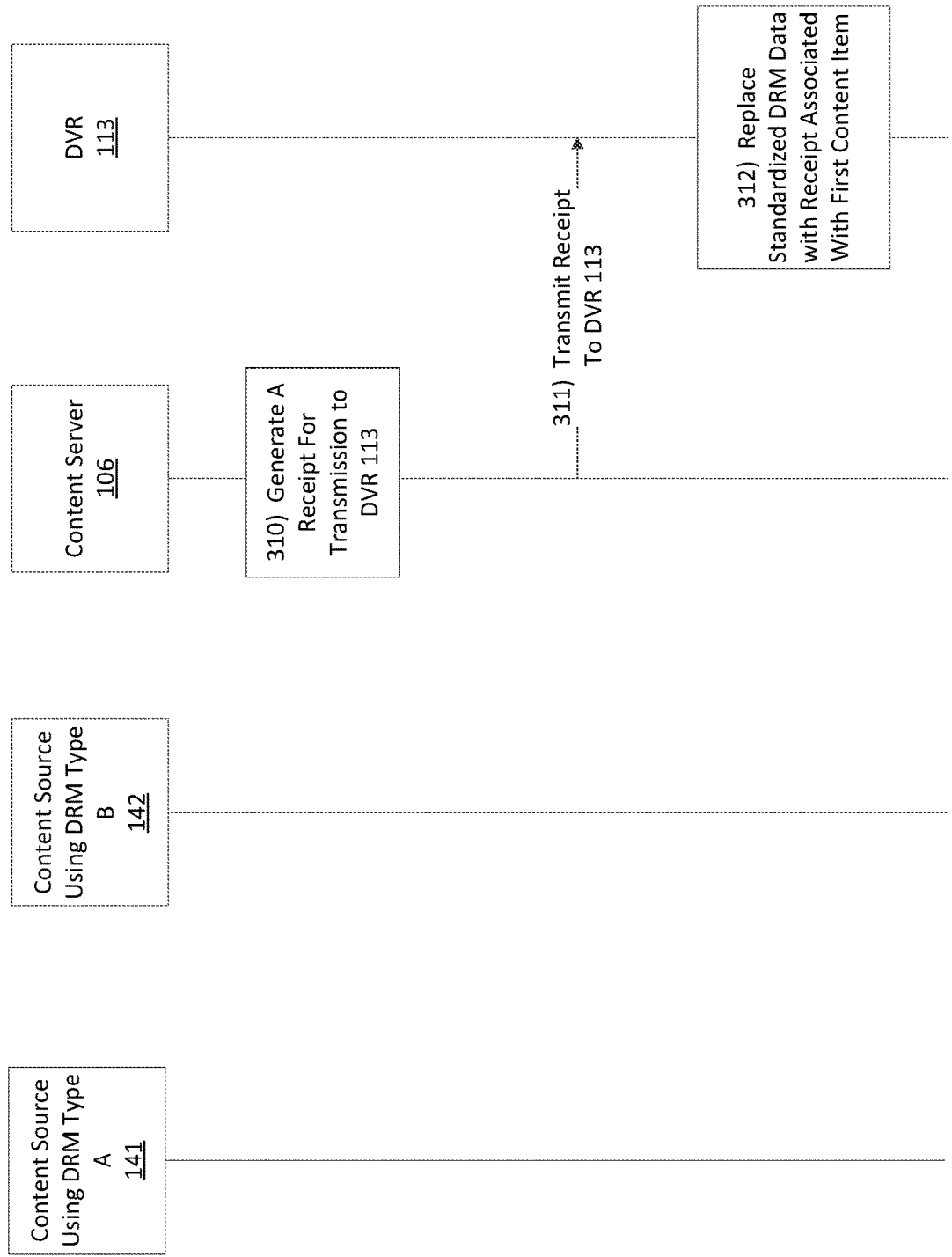

As shown in FIG. 3d, assuming that the user device 112-117, 125 is entitled to access the first content item, the content server 106 may, in step 310, generate a receipt for transmission to the user device 112-117, 125. The receipt may include the content identifier in the request, the account identifier in the request, a key identifier associated with a key for decrypting the first content item, and a key type identifier associated with the key for decrypting the first content item. The receipt may further include a time at which the receipt was issued by the server 106. The receipt may serve as proof of rights to the first content item at the time at which the recording of the first content item was generated by the user device 112-117, 125. In step 311, the server 106 may transmit the receipt to the user device 112-117, 125.

Figure 3E:
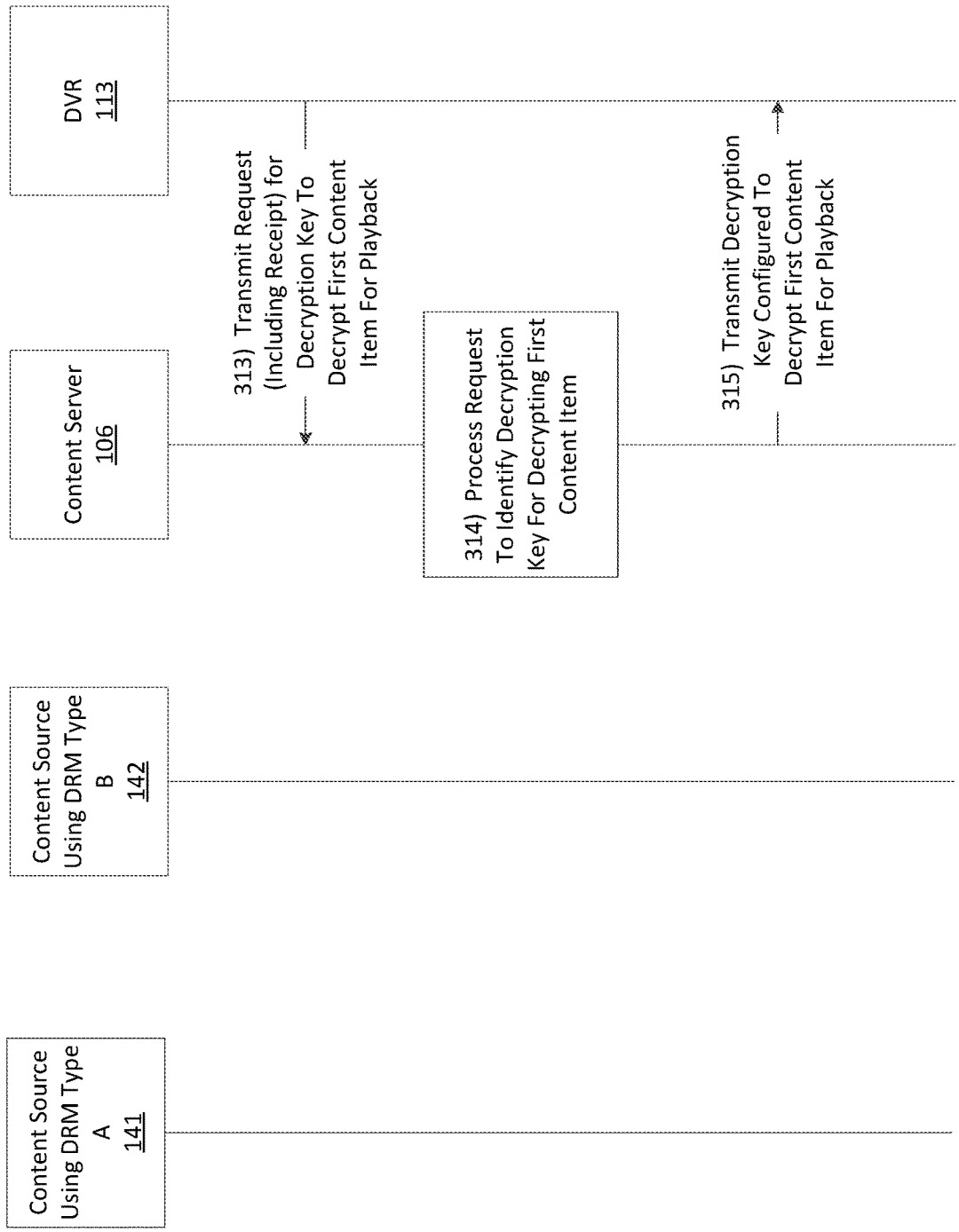

In step 312, the user device 112-117, 125 may replace the standardized DRM data securing the first content item with the information in the receipt. The information in the receipt may also be used to update the manifest file associated with the first content item to instruct the user device 112-117, 125 to transmit the receipt to the content server 106 if the user device 112-117, 125 decides to access the first content item (e.g., for playback, viewing, etc.). The receipt may also provide the information to encrypt the first content item. In other examples, the encryption metadata for encrypting the first content item may be specified and stored separate from the information contained in the receipt. As shown in FIG. 3e, in step 313, if the user device 112-117, 125 is ready to access the first content item, the user device 112-117, 125 may transmit a request for a decryption key to decrypt the first content item. This request may include the associated encryption metadata and receipt, which may serve as DRM information for use in determining whether the user device 112-117, 125 should be given access to the first content item.

Inn step 314, the content server 106 may process the request transmitted in step 313 to identify a decryption key for decrypting the first content item. The receipt in the request to playback the first content item may be acknowledged by the server 106 as an in-band authorization for the content decryption key associated with the first content item. The request for accessing the first content item may not require out-of-band DRM protocol communications between the content server 106 (or a dedicated DRM server) and the user device 112-117, 125. In processing the request, the content server 106 may verify the authenticity of the receipt included in the request and may access previously stored security information as well as the cryptographic state for the first content item. The server 106 may further validate that the user device 112-117, 125 specified in the receipt is associated with the account identified by the receipt. Further still, the content identity from the encryption metadata may be validated to determine that it matches the content identifier asserted by the receipt. The server 106 (or an associated content key management server 199) may resolve a decryption key based on the encryption metadata. If the server 106 determines that the user device 112-117, 125 was authorized to access the first content item based on all of this information, and in step 315, the server 106 may transmit, to the user device 112-117, 125, the decryption key configured to decrypt the first content item for playback. If the server 106 determines that the user device 112-117, 125 was not authorized to access the first content item based on this information, the server 106 may not transmit a decryption key to the user device 112-117, 125. The server 106 may instead transmit a message detailing why the decryption key was not sent to the user device 112-117, 125.

The content server 106 may generate and display different messages (e.g., to a user interfacing with the server 106) based on the results of processing the request transmitted in step 313. For example, the server 106 may generate a message that the request was processed successfully and resulted in issuing a decryption key to the user device 112-117, 125. Alternatively, the server 106 may generate one or more error messages if a decryption key cannot be transmitted to the user device 112-117, 125. For example, the server 106 may generate a message that the request is malformed or that the information in the request cannot be properly authenticated. Alternatively, the server 106 may generate a message that the server 106 has been misconfigured, is unavailable, or is overloaded and so cannot process the request.

Figure 3F:
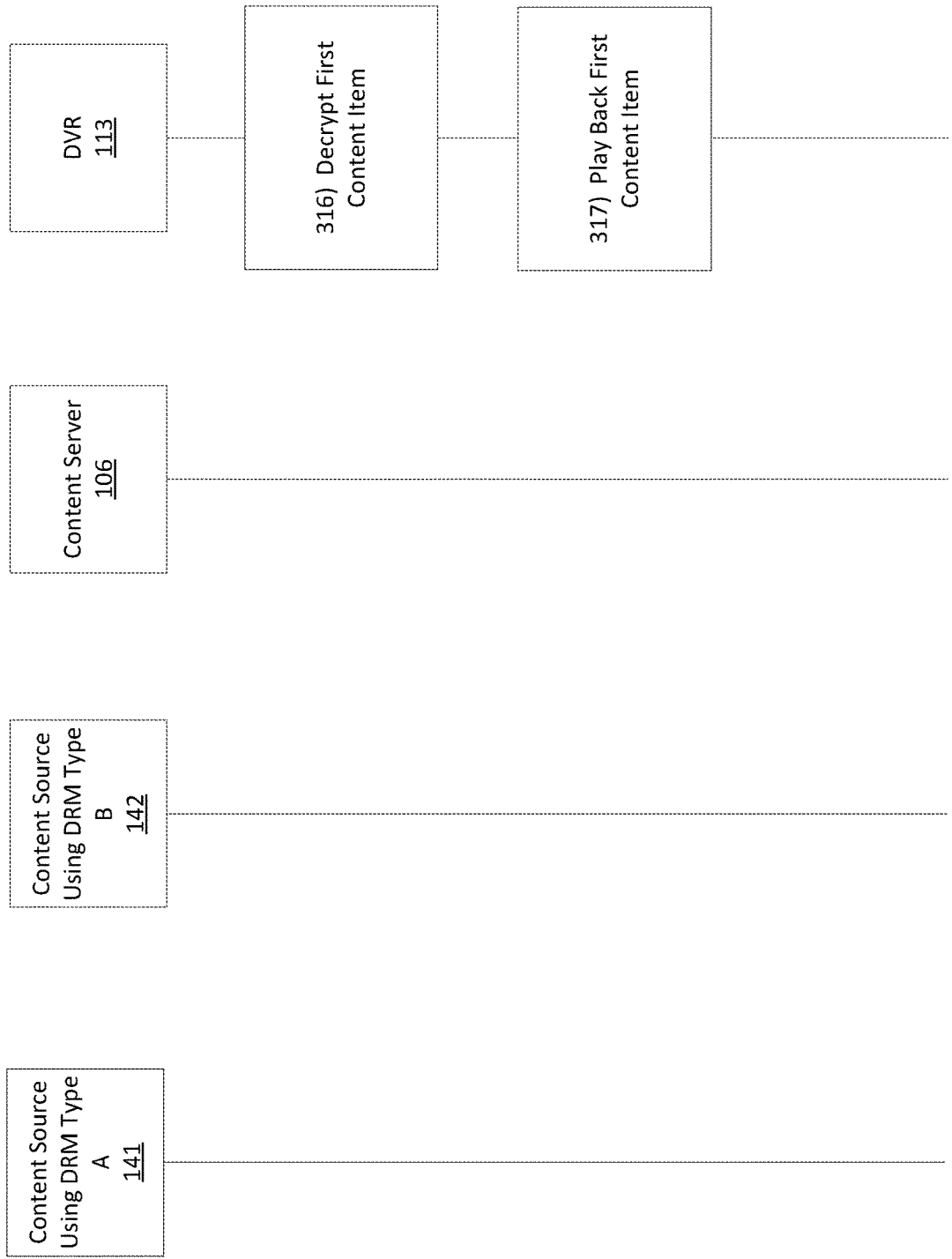

As shown in FIG. 3f, in step 316, the user device 112-117, 125 may decrypt (and decode) the first content item using the decryption key received in step 315 and may play back the first content item in step 317.

A user device 112-117, 125 may transmit a locally stored "entitlement snapshot" (i.e., the authentication receipt) to the content server 106 and the server 106 may use this entitlement snapshot in determining whether or not the user was authorized to access the content item in question. In this way, the content server 106 may still act as gatekeeper so that a user device 112-117, 125 may not be able to just access a content item on its own without any check. The manifest file associated with a given content item may also need to be adjusted to instruct the user device 112-117, 125 to query the content server 106 so that the content server 106 may verify the authenticity of the receipt and provide a decryption key for accessing the content item in question.

In addition, a user device 112-117, 125 may not need to be re-designed (and may not need to persist a DRM license) every time a content source (e.g., the content sources 141-144) changes a DRM protocol used to secure content. Moreover, the entitlement history of a user device 112-117, 125 to a given content item may not need to be maintained by a local office 103 (because that history is persisted in the receipt stored locally at the time of content recording in the user device 112-117, 125). Further still, the method described herein may result in a DRM independent workflow for receipt download, future decryption key acquisition, and future decryption and decoding by the user device 112-117, 125.

A user device 112-117, 125 may transmit the request to authenticate entitlement to access a given content item to a first content server 106 (e.g., an entitlement server) associated with a local office 103 and may transmit the request for a decryption key to playback the content item to a second content server 106 (e.g., a content key manager) associated with local office 103. Acquisition of the receipt by the user device 112-117, 125 may be subject to the same set of access and entitlement checks that are normally performed during acquisition of a DRM license acquisition. However, the user device 112-117, 125 may acquire a decryption key for a given content item without requiring content server 106 to re-perform the access and entitlement checks (e.g., by transmitting a receipt to content server 106). Because DRM protocols evolve over time and content providers may switch from one DRM protocol to a different DRM protocol, the methods and systems discussed herein further provide a way of providing access to content in a manner that is independent of DRM protocols.

The user devices 112-117, 125 may comprise trusted devices that are known to be authentic to a local office 103. Complex DRM routines are not required for determining entitlement to content requested by the user devices 112-117, 125. Rather, the user devices 112-117, 125 and the local office 103 (e.g., via a content server 106) may exchange a few messages to bypass complex DRM routines and requirements.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
    generating, based on first digital rights management (DRM) data in a first DRM protocol and associated with a content item, second DRM data in a second DRM protocol;
    sending, to a plurality of devices, the content item and a manifest file associated with the content item and comprising the second DRM data;
    receiving, after sending the content item and from a device of the plurality of devices, an entitlement request to access the content item;
    sending, to the device and based on the entitlement request, information indicating that the device is entitled to access the content item;
    receiving, from the device, a second request for information for playback of the content item, wherein the second request comprises the information indicating that the device is entitled to access the content item; and
    sending, to the device and based on the second request, a decryption key for the content item.

2. The method of claim 1, wherein the information indicating that the device is entitled to access the content item comprises device-specific DRM data associated with use of a recording of the content item.

3. The method of claim 1, wherein the information indicating that the device is entitled to access the content item comprises device-specific DRM data for encryption of the content item.

4. The method of claim 1, further comprising granting the entitlement request to access the content item, wherein the granting is based on determining that a device identifier in the entitlement request matches a device identifier that is in a database of device identifiers for a plurality of devices that should be given access to the content item.

5. The method of claim 1, wherein the information indicating that the device is entitled to access the content item gives the device permission to use a copy of the content item, recorded by the device, for a time period.

6. The method of claim 1, wherein receiving the second request for information for playback of the content item comprises:
    receiving, via an in-band communication from the device, a second the second request for information for playback of the content item.

7. The method of claim 1, further comprising:
    determining, based on a content identifier in the information indicating that the device is entitled to access the content item matching a content identifier associated with encryption metadata, the decryption key, wherein the decryption key is configured to decrypt the content item for playback.

8. The method of claim 1, wherein receiving the entitlement request to access the content item comprises:
    receiving, from the device and after the device has begun recording the content item, the entitlement request,
    wherein the entitlement request comprises a content identifier for the content item, an account identifier for a user of the device, and a device identifier for the device.

9. The method of claim 1, wherein the information indicating that the device is entitled to access the content item comprises a content identifier for the content item, an account identifier for a user of the device, and a key identifier associated with the content item.

10. The method of claim 1, wherein the second DRM data comprises an account identifier, wherein the entitlement request comprises the account identifier.

11. The method of claim 1, further comprising:
receiving, from the device, a future request for the content item, wherein the future request comprises the information indicating that the device is entitled to access the content item.

12. The method of claim 1, wherein the plurality of devices comprises a plurality of end user devices.

13. The method of claim 1, further comprising:
updating, using the information indicating that the device is entitled to access the content item, the manifest file.

14. The method of claim 1, further comprising:
adding the information indicating that the device is entitled to access the content item to an entitlement history stored on the device, wherein the entitlement history indicates prior entitlements of the device to access the content item.

15. The method of claim 1, further comprising:
sending, by the device and to a second device of the plurality of devices, a copy of the content item and the manifest file, wherein the manifest file comprises an access restriction.

16. The method of claim 1, wherein the second DRM data comprises a restriction on making copies of the content item.

17. The method of claim 1, wherein the information indicating that the device is entitled to access the content item comprises an instruction to include the information indicating that the device is entitled to access the content item in a future request for the content item.

18. One or more non-transitory computer-readable media storing instructions that, when executed, cause:
generating, based on first digital rights management (DRM) data in a first DRM protocol and associated with a content item, second DRM data in a second DRM protocol;
sending, to a plurality of devices, the content item and a manifest file associated with the content item and comprising the second DRM data;
receiving, after sending the content item and from a device of the plurality of devices, an entitlement request to access the content item;
sending, to the device and based on the entitlement request, information indicating that the device is entitled to access the content item;
receiving, from the device, a second request for information for playback of the content item, wherein the second request comprises the information indicating that the device is entitled to access the content item; and
sending, to the device and based on the second request, a decryption key for the content item.

19. The one or more non-transitory computer-readable media of claim 18, wherein the information indicating that the device is entitled to access the content item comprises device-specific DRM data associated with use of a recording of the content item.

20. The one or more non-transitory computer-readable media of claim 18, wherein the information indicating that the device is entitled to access the content item comprises device-specific DRM data for encryption of the content item.

21. The one or more non-transitory computer-readable media of claim 18, wherein the instructions, when executed, cause:
granting the entitlement request to access the content item, wherein the granting is based on determining that a device identifier in the entitlement request matches a device identifier that is in a database of device identifiers for a plurality of devices that should be given access to the content item.

22. The one or more non-transitory computer-readable media of claim 18, wherein the information indicating that the device is entitled to access the content item gives the device permission to use a copy of the content item, recorded by the device, for a time period.

23. The one or more non-transitory computer-readable media of claim 18, wherein the instructions, when executed, cause:
receiving, via an in-band communication from the device, the second request for information for playback of the content item.

24. The one or more non-transitory computer-readable media of claim 18, wherein the instructions, when executed, cause:
determining, based on a content identifier in the information indicating that the device is entitled to access the content item matching a content identifier associated with encryption metadata, the decryption key, wherein the decryption key is configured to decrypt the content item for playback.

25. The one or more non-transitory computer-readable media of claim 18, wherein the instructions, when executed, cause:
receiving, from the device and after the device has begun recording the content item, the entitlement request, wherein the entitlement request comprises a content identifier for the content item, an account identifier for a user of the device, and a device identifier for the device.

26. The one or more non-transitory computer-readable media of claim 18, wherein the information indicating that the device is entitled to access the content item comprises a content identifier for the content item, an account identifier for a user of the device, and a key identifier associated with the content item.

27. The one or more non-transitory computer-readable media of claim 18, wherein the second DRM data comprises an account identifier, wherein the entitlement request comprises the account identifier.

28. The one or more non-transitory computer-readable media of claim 18, wherein the instructions, when executed, cause:
receiving, from the device, a future request for the content item, wherein the future request comprises the information indicating that the device is entitled to access the content item.

29. An apparatus comprising:
one or more processors; and
memory storing instructions that, when executed by the one or more processors, cause the apparatus to:
generate, based on first digital rights management (DRM) data in a first DRM protocol and associated with a content item, second DRM data in a second DRM protocol;
send, to a plurality of devices, the content item and a manifest file associated with the content item and comprising the second DRM data;
receive, after sending the content item and from a device of the plurality of devices, an entitlement request to access the content item;

send, to the device and based on the entitlement request, information indicating that the device is entitled to access the content item;

receive, from the device, a second request for information for playback of the content item, wherein the second request comprises the information indicating that the device is entitled to access the content item; and send, to the device and based on the second request, a decryption key for the content item.

30. The apparatus of claim 29, wherein the information indicating that the device is entitled to access the content item comprises device-specific DRM data associated with use of a recording of the content item.

31. The apparatus of claim 29, wherein the information indicating that the device is entitled to access the content item comprises device-specific DRM data for encryption of the content item.

32. The apparatus of claim 29, wherein the instructions, when executed by the one or more processors, cause the apparatus to:

grant the entitlement request to access the content item, wherein the granting is based on determining that a device identifier in the entitlement request matches a device identifier that is in a database of device identifiers for a plurality of devices that should be given access to the content item.

33. The apparatus of claim 29, wherein the information indicating that the device is entitled to access the content item gives the device permission to use a copy of the content item, recorded by the device, for a time period.

34. The apparatus of claim 29, wherein the instructions, when executed by the one or more processors, cause the apparatus to:

receive, via an in-band communication from the device, the second request for information for playback of the content item.

35. The apparatus of claim 29, wherein the instructions, when executed by the one or more processors, cause the apparatus to:

determine, based on a content identifier in the information indicating that the device is entitled to access the content item matching a content identifier associated with encryption metadata, the decryption key, wherein the decryption key is configured to decrypt the content item for playback.

36. The apparatus of claim 29, wherein the instructions, when executed by the one or more processors, cause the apparatus to:

receive, from the device and after the device has begun recording the content item, the entitlement request, wherein the entitlement request comprises a content identifier for the content item, an account identifier for a user of the device, and a device identifier for the device.

37. The apparatus of claim 29, wherein information indicating that the device is entitled to access the content item comprises a content identifier for the content item, an account identifier for a user of the device, and a key identifier associated with the content item.

38. The apparatus of claim 29, wherein the second DRM data comprises an account identifier, wherein the entitlement request comprises the account identifier.

39. The apparatus of claim 29, wherein the instructions, when executed by the one or more processors, cause the apparatus to:

receive, from the device, a future request for the content item, wherein the future request comprises the information indicating that the device is entitled to access the content item.

\* \* \* \* \*